Patented July 9, 1935

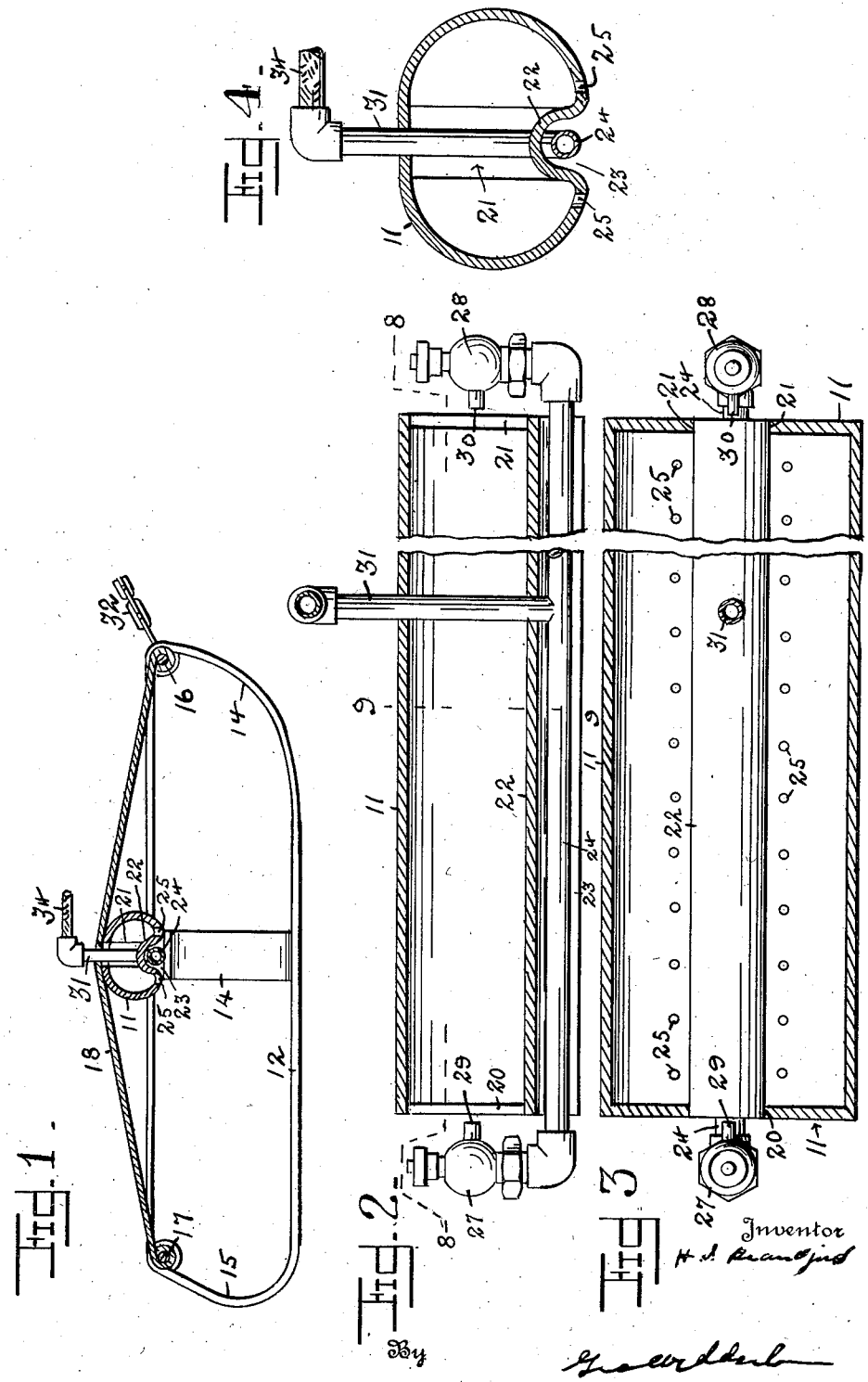

2,007,739

UNITED STATES PATENT OFFICE 2,007,739

BURNER

Hans I. Brandjord, Souris, N. Dak.

Application March 20, 1930, Serial No. 437,427

1 Claim. (Cl. 158—63)

This invention relates to burner devices, and has for one of its objects to provide a simply constructed apparatus adapted to be drawn over the ground by any suitable power, and operative ito burn and thus destroy noxious weeds and the stubble prior to the plowing; and also to destroy different kinds of weeds after they have appeared above the ground following the action of cultivators.

The device will also be found useful for destroying plant growths along highways.

With the above and such other objects in view as may be more fully hereinafter described, I have invented the device illustrated in the accompanying drawing, in which:

Figure 1 is a central longitudinal section of the device.

Figure 2 is an enlarged longitudinal vertical section of the burner.

Figure 3 is a section on line 8—8 of Fig. 2.

Figure 4 is a section on line 9—9 of Fig. 2.

The improved device is adapted to be drawn over the ground by any suitable power, either motor driven tractor or truck, or horse power.

The improved burner includes a tubular member 11 coupled to a pair of runners 12 by inclined braces 13. The runners 12 are curved upwardly at the front and rear as at 14 and 15, the upturned terminals 14 being connected by a rod 16, while the terminals 15 are connected by a rod 17. A deflecting plate 18 is rolled at the ends around the rods 16 and 17, and bears at the center over the member 11 as shown. The ends of the member 11 are formed with central vertical 20 and 21 and with the longitudinal central portion of the bottom curved upwardly as shown at 22, to form a longitudinally directed recess 23 in which the horizontal portion 24 of the intake conductor for the liquid fuel is received. A plurality of orifices 25 are formed through the bottom of the member 11 near the upturned portion 22, through which the burning mixture passes into the space between the deflecting plate 18 and the ground. At its ends the pipe member 24 is provided respectively with controlling valves 27 and 28 having nipples 29 and 30 directed inwardly or toward the interior of the member 11 which thus becomes the mixing chamber of the burner, the requisite proportion of air entering through the openings 20 and 21 and mingling with the vaporized liquid fuel.

The feed pipe for the liquid fuel is represented at 31, and is connected to the horizontal pipe section 24. The horizontal portion 24 of the fuel intake is exposed within the recess 23 to the intense heat from the heated wall 22, and the hydrocarbon fuel is thereby vaporized and enters the member 11 as a highly inflammable gas, and commingles with the air entering through the openings 20 and 21, and passes thence downwardly through the orifices 25 and when ignited produces intense flames which are projected downwardly against the ground and consumes any growth thereon. The plate 18 operates to confine the fire to the space therebeneath.

The burner is coupled to the pulling element, by chains 32 or the like connected to the intake pipe 31, is one end of a flexible conveyor tube 34, the other end of which is connected to the valve controlled outlet of a fuel tank 33, swung under the truck 10.

Having now described my invention, that which I claim to be new and desire to protect by Letters Patent, is:

In a device as described, a mixing chamber including a bottom wall having a longitudinal external recess therein, a fuel vaporizing pipe, seated within said recess throughout its length, means for supplying fuel to said pipe, and means whereby vapors formed in the pipe will be injected into said chamber, at both ends thereof, said bottom wall having gas jet apertures therein along each side of said vaporizing pipe.

HANS I. BRANDJORD.